(No Model.)

W. H. GATES.
UNIVERSAL AUTOMATIC CHUCK.

No. 461,870. Patented Oct. 27, 1891.

Witnesses
Chas. F. Schmelz
Chas. S. Short Jr.

Inventor
William H. Gates,
By his Attorney
John C. Dewey

UNITED STATES PATENT OFFICE.

WILLIAM H. GATES, OF WORCESTER, MASSACHUSETTS, ASSIGNOR OF ONE-HALF TO ARTHUR CREED WRIGHT, OF SAME PLACE.

UNIVERSAL AUTOMATIC CHUCK.

SPECIFICATION forming part of Letters Patent No. 461,870, dated October 27, 1891.

Application filed June 8, 1891. Serial No. 395,496. (No model.)

*To all whom it may concern:*

Be it known that I, WILLIAM H. GATES, a citizen of the United States, residing at Worcester, in the county of Worcester and State of Massachusetts, have invented certain new and useful Improvements in Universal Automatic Chucks; and I do hereby declare that the following is a full, clear, and exact description thereof, which, in connection with the drawings making a part of this specification, will enable others skilled in the art to which my invention belongs to make and use the same.

My invention relates to universal automatic chucks, and more particularly to chucks used on machines for manufacturing screws, said chucks being adapted to clamp the wire from which the screws are made.

The object of my invention is to improve upon the construction of chucks for screw or other machines as now ordinarily made and to provide a chuck all the clamping-jaws of which can at one operation be adjusted for holding different sizes of wire.

My invention consists in certain novel features of construction and operation of an automatic chuck of the class above referred to, and more particularly in combining with the ordinary parts of said chuck a conical or tapering shell for adjusting and holding in place when adjusted the clamping-jaws.

Figure 1:
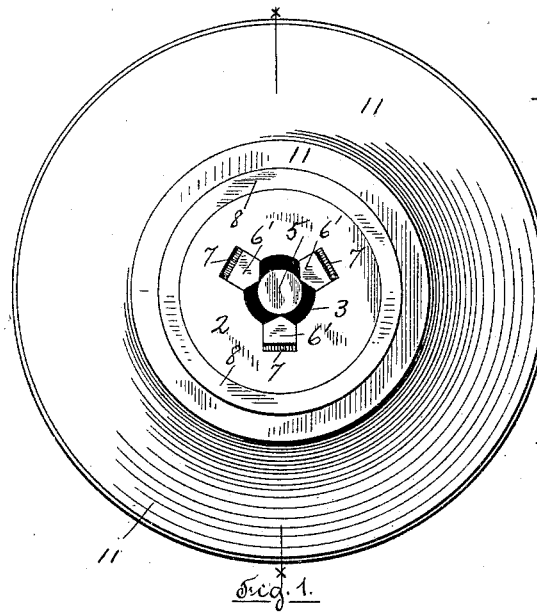
Figure 2:
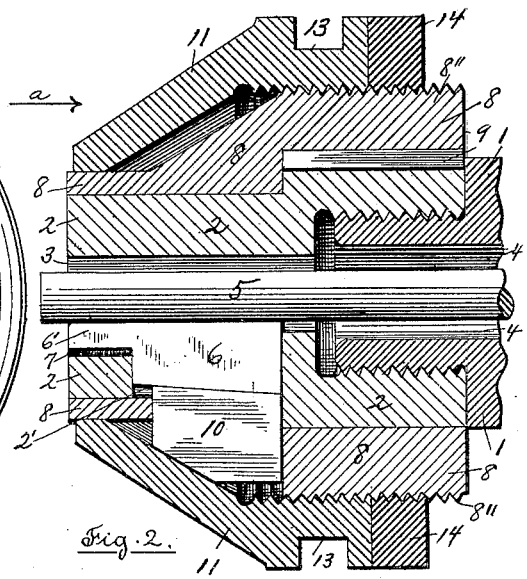
Figure 4:
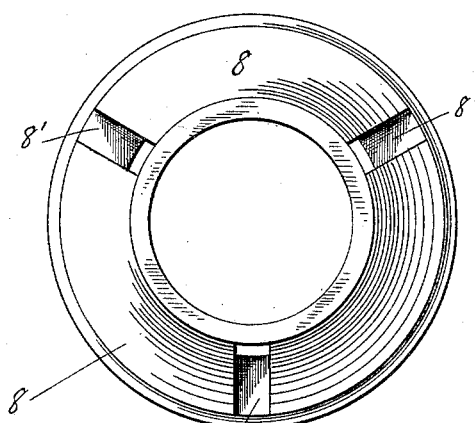
Figure 3:
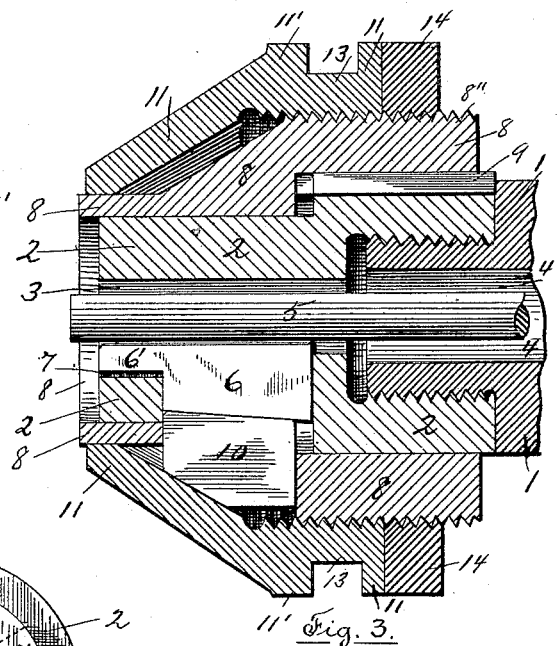
Figure 5:
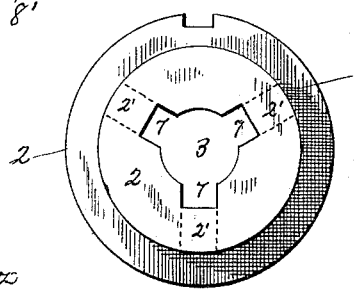

Referring to the drawings, Figure 1 represents a front view of my improved chuck, looking in the direction of arrow $a$, Fig. 2. Fig. 2 is a central longitudinal section on line $x$ $x$, Fig. 1. Fig. 3 is a similar section showing the parts in a different position. Fig. 4 is an end view of the wedge-holding sleeve detached, looking in the direction of arrow $a$, Fig. 2; and Fig. 5 is an end view of the central spindle for holding the jaws, looking in the direction of arrow $a$, Fig. 2.

In the accompanying drawings, 1 is the end of the spindle of a screw or other machine, having a screw-thread on the end thereof, as is customary.

2 is the body of chuck, which is enlarged slightly at its inner end and provided with an internal screw-thread, which is adapted to be screwed onto the screw-thread on the spindle 1. A central longitudinal hole 3 extends through the body of the chuck 2, and a longitudinal hole 4 extends through the spindle 1. Through said holes 3 and 4 the wire or rod 5 which is to be operated upon extends and is held by the clamping-jaws and at the proper time released from the action of the jaws and fed forward in the ordinary way.

The body 2 of the chuck has three openings 2' extending through the sides thereof corresponding to the number of clamping-jaws 6, as shown in Figs. 2 and 3. The clamping-jaws 6 are supported in the openings 2' in the body 2, and are adapted to move inwardly and outwardly therein—that is, toward and away from each—to clamp and release the wire extending between them, but said jaws do not move longitudinally in the body 2. The outer edge of the clamping-jaws 6 is made slightly tapering or beveled, (see Figs. 2 and 3,) for the corresponding beveled wedges, to be hereinafter described, to work on and move said jaws inwardly, as shown in Fig. 2, or to allow said jaws to be moved outwardly, as shown in Fig. 3. The forward ends 6' of the jaws 6 are narrowed down, as shown in the drawings, and adapted to fit in the grooves 7 in the front portion of the body 2. (See Figs. 1 and 5.)

Extending on the outside of the body 2 of the chuck is a sleeve 8, which is adapted to slide longitudinally on the body 2, but is prevented from turning thereon, in this instance by a key 9. The sleeve 8 is turned down at its front end, so as to leave an inclined or conical-shaped surface, extending from the screw-threaded portion 8'', and a horizontal surface extending from the lower end of said inclined surface to the front end of the sleeve, as clearly shown in Figs. 2 and 3. The sleeve 8 has three openings 8' therein, through which extend the three wedges 10, the inner edges of which are made beveled and adapted to bear on the outer beveled edges of the clamping-jaws 6, as clearly shown in Figs. 2 and 3. The outer edges of the wedges 10 are made beveled and are adapted to be engaged by the corresponding beveled inner surface of conical or tapering shell 11. Said shell 11 is provided with a screw-thread at its inner end upon its interior surface, which is adapted to engage a screw-thread 8" upon the outer surface of the shell 8 at its inner end. (See Figs. 2 and 3.)

The conical-shaped shell 11 is provided with a circumferential groove 13 therein, into which extends the yoke (not shown) for moving said shell 11 and the sleeve 8 connected therewith and the wedges 10 supported in said sleeve longitudinally back and forth on the body 2 of the chuck, to allow the clamping-jaw 6 to open or move outwardly, to release the wire held between them preparatory to the wire being fed forward, and to close or move inwardly the clamping-jaws and clamp the wire preparatory to the same being operated upon, all in the ordinary way.

A chuck-nut 14 is screwed upon the inner end of the sleeve 8, and is adapted to be screwed against the inner end of the shell 11 to hold the same in position when adjusted on the sleeve 8 and to prevent the turning of the shell 11 on said sleeve 8 after the shell 11 has been properly adjusted relatively to the wedges 10 to regulate the clamping action of the jaws 6.

It will be understood that the jaws 6 are supported in the body 2 of the chuck and the wedges 10 in the sleeve 8 independently of the conical-shaped shell 11, and that said shell is made with a solid exterior surface on the tapering part thereof and that the inner portion of said surface is adapted to slide on the outer beveled surface of the wedges 10, as clearly shown in Figs. 2 and 3, when the shell 11 is rotated on the sleeve 8. By means of the screw-thread 8" on the outer surface of the sleeve 8 and the engaging screw-thread on the inner surface of the shell 11 the shell 11 may be rotated back and forth on the sleeve 8, said sleeve remaining stationary, for there is a free open space extending around the sleeve 8 between the inner surface of the conical-shaped portion of the shell 11 and the inclined surface of the sleeve 8, as shown in the upper part of Figs. 2 and 3.

The purpose of the shell 11 is to adjust the clamping-jaws 6, through the intervention of the wedges 10, for different sizes of wire and to hold said jaws in place when once adjusted.

By rotating the shell 11 on the sleeve 8 in a direction toward the inner end of the chuck, the inner inclined surface of the shell 11 will move on the outer beveled surface of the wedges 10 and force said wedges 10 and the jaws 6, against which they bear, inwardly toward the center of the chuck. By rotating the shell 11 on the sleeve 8 in an opposite direction toward the outer end of the chuck, the inner inclined surface of the shell 11 will move away from the outer beveled edge of the wedges 10 and allow said wedges 10 and the jaws 6 to be moved outwardly by the insertion of a wire between the inner faces of said jaws, as will be readily understood by those skilled in the art. When the shell 11 has been rotated on the sleeve 8, so as to properly adjust the clamping-jaws 6, it is held in place by means of the chuck-nut 14, and then said shell 11 is moved longitudinally with the sleeve 8 and the wedges 10 as said sleeve 8 is moved longitudinally on the body 2 of the chuck to allow of the feeding forward of the wire and the clamping thereof between the holding-jaws in the operation of the machine in the ordinary way.

From the above description, in connection with the drawings, the operation of my improved chuck will be readily understood by those skilled in the art, and is as follows: The chuck-nut 14 is turned toward the rear end of the sleeve 8 to allow of the turning of the shell 11 backward or forward on the sleeve 8. The shell 11 is preferably provided with a knurled edge at 11' to permit of grasping the same to turn said shell. In case a small wire is used the shell is turned backward on the sleeve 8, causing the inner beveled surface thereof bearing on the outer beveled edge of the wedges 10 (see Figs. 2 and 3) to force said wedges and the jaws 6, against which said wedges bear, uniformly toward each other to clamp the wire. When the clamping-jaws 6 have been moved toward each other sufficiently to clamp the wire, as shown in Figs. 1 and 2, then the chuck-nut 14 is turned up against the rear end of the shell 11 to hold the same in place. In case a large wire is to be used the shell 11 is turned in the opposite direction away from the chuck-nut 14, thus moving the inner beveled surface of said shell down on the beveled edges of the wedges 10 and allowing said wedges 10 and the jaws 6 to be moved outwardly by the insertion of a wire between said jaws until a sufficiently large opening is left between the clamping-jaws for the reception of the wire to be operated upon. The chuck-nut 14 is then turned up against the inner end of the shell 11 to hold the same in place.

In Fig. 2 the parts of the clutch are shown in the position which they occupy when the wire 5 is clamped preparatory to being operated upon.

In Fig. 3 the parts are shown in the position which they occupy when the sleeve 8, carrying the wedges 10, and the shell 11 have been moved forward by the yoke (not shown) to give an opportunity for the jaws 6 to open or move outwardly to release the wire preparatory to the same being fed forward. By the reverse movement of the yoke and the return of the parts to the position shown in Fig. 2 the wire is again clamped by the jaws 6.

It will be understood that after the clamping-jaws 6 have been properly adjusted by means of the conical-shaped shell 11, as above described, for a particular size wire they do not require to be adjusted again until a different-sized wire is used.

The advantage of my improved chuck will be readily appreciated by those skilled in the art.

It will be seen that by means of the conical-shaped shell 11 with its inner beveled or tapering surface bearing against the beveled or tapering edges of the wedges 10 I am enabled by moving said shell in one direction or the other on the sleeve 8 to adjust the three clamping-jaws at one operation and exactly alike, thus saving a great deal of the time required to adjust each clamping-jaw separately, as has been customary heretofore.

Having thus described my invention, what I claim as new, and desire to secure by Letters Patent, is—

1. In a chuck, the combination, with the body of the chuck having a central longitudinal hole therein for the passage of the wire to be operated on, and openings in the sides thereof through which the clamping-jaws extend, and said clamping-jaws and a sleeve supported and adapted to slide longitudinally on the body of the chuck, but prevented from turning thereon, said sleeve provided with openings in the sides thereof, and wedges extending through said openings adapted to move with said sleeve and to bear at their inner edges upon the clamping-jaws, of a conical-shaped shell connected with said sleeve by a screw-thread and adapted to be rotated thereon to adjust the clamping-jaws and hold them in place when adjusted, substantially as set forth.

2. In a chuck, the combination, with the body of the chuck having a central longitudinal hole therein and openings in the sides thereof, through which extend and are supported the clamping-jaws, and said clamping-jaws adapted to move in or out in the openings in the body of the chuck, and a sleeve supported on the body of the chuck and adapted to slide back and forth longitudinally thereon, said sleeve having openings in the sides thereof, through which extend and are supported wedges which slide back and forth with said sleeve, and said wedges adapted to bear at their inner edges upon the clamping-jaws to move said jaws inwardly, of a conical-shaped shell extending over the sleeve 8 and connected therewith by a screw-thread and adapted to be rotated on said sleeve to adjust the clamping-jaws and to move longitudinally with said sleeve, substantially as set forth.

3. In a chuck, the combination, with the body 2, having a central longitudinal hole therein, and openings 2', extending through the sides thereof, and clamping-jaws 6, extending through said openings and supported therein, and a sleeve 8, adapted to slide longitudinally on the body 2, and prevented from turning thereon, said sleeve having openings 8' in the sides thereof, and wedges 10, extending through said openings and adapted to move in or out therein and to move with said sleeve, of a conical-shaped shell 11, extending over said sleeve and provided with an internal screw-thread adapted to engage a screw-thread on the sleeve 8 and to be rotated on said sleeve to cause the inner inclined surface of said shell to work on the outer beveled edges of the wedges 10 to adjust the clamping-jaws 6, substantially as set forth.

WILLIAM H. GATES.

Witnesses:
JOHN C. DEWEY,
ARTHUR CREED WRIGHT.